United States Patent
Chen

(10) Patent No.: US 12,443,051 B2
(45) Date of Patent: Oct. 14, 2025

(54) NOSE PAD ADJUSTMENT ASSEMBLY

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 597 days.

(21) Appl. No.: 17/854,488

(22) Filed: Jun. 30, 2022

(65) Prior Publication Data
US 2024/0004217 A1    Jan. 4, 2024

(51) Int. Cl.
*G02C 5/12*    (2006.01)

(52) U.S. Cl.
CPC ......... *G02C 5/122* (2013.01); *G02C 2200/04* (2013.01)

(58) Field of Classification Search
CPC .... G02C 5/122; G02C 5/126; G02C 2200/04; G02C 2200/08; G02C 2200/06
See application file for complete search history.

(56) References Cited

U.S. PATENT DOCUMENTS

| | | | | |
|---|---|---|---|---|
| 7,472,991 | B1 * | 1/2009 | Chen | G02C 5/122 |
| | | | | 351/137 |
| 2015/0015842 | A1 * | 1/2015 | Chen | G02C 5/12 |
| | | | | 351/136 |
| 2015/0049298 | A1 * | 2/2015 | Chen | G02C 5/122 |
| | | | | 351/137 |
| 2015/0205144 | A1 * | 7/2015 | Chin | G02C 5/122 |
| | | | | 351/137 |
| 2019/0107732 | A1 * | 4/2019 | Canales | G02C 7/02 |
| 2019/0377194 | A1 * | 12/2019 | Chen | G02C 5/126 |

* cited by examiner

*Primary Examiner* — Ricky L Mack
*Assistant Examiner* — Anna Smith
(74) *Attorney, Agent, or Firm* — Rosenberg, Klein & Lee

(57) ABSTRACT

A nose pad adjustment assembly is revealed. The nose pad adjustment assembly includes two nose pad blocks and a nose pad base which consists of a recess portion and two connection portions located at two sides of the recess portion correspondingly. The connection portion has an upper locking hole and a lower locking hole. The nose pad block includes an upper protrusion and a lower protrusion respectively movable transversely in the upper locking hole and the lower locking hole correspondingly. The upper and the lower protrusions are respectively provided with a plurality of upper and lower locking grooves which are able to be engaged and connected with the upper and the lower locking holes correspondingly. Thereby the nose pad blocks can be adjusted for close fit to user's nose bridge. Therefore, glasses are positioned without sliding freely and users feel more comfortable while wearing the glasses.

4 Claims, 9 Drawing Sheets

NOSE PAD ADJUSTMENT ASSEMBLY

BACKGROUND OF THE INVENTION

Field of the Invention

The present invention relates to a nose pad adjustment assembly, especially to a nose pad adjustment assembly which not only allows glasses to be worn and positioned without sliding freely but also provides more comfort to users while wearing the glasses. The nose pad adjustment assembly is more convenient to operate and more practical and effective to use.

Description of Related Art

Generally, various types of glasses are classified according to their functions or purposes such as optical glasses, sunglasses, sports glasses, and safety glasses. The respective types of glasses have different designs of frames. For example, full frame glasses feature on that lenses are surrounded and held in a frame, making them well-protected. Thus the full frame glasses are usually used in optical glasses with expensive lenses. As to half frame glasses, they are lighter than the full frame glasses. Thus most of casual sunglasses, sports glasses and safety glasses are half frame glasses so that users can feel easy and convenient during outdoor activities, sports or construction operations.

No matter what kind of glasses you wear, they are provided with a nose piece/pad located under a middle part of the glasses and used for leaning on users' nose bridge while they are wearing the glasses. The nose piece is not only used for positioning the glasses, but also providing more comfort to users who wear the glasses.

Although the above nose pad can achieve the expected functions while the users wear the glasses, it still has certain shortcomings while in use. The nose pad of glasses with plastic frames is integrally produced so that a height and an angle of the nose pad are fixed. Yet a height and a width of different user's nose bridge are quite different. Thereby the nose pad is unable to lean on two sides of the user's nose bridge properly and this further causes conditions such as easily sliding or inclining of the glasses and a shift of a focal point of the lens to occur.

Thus there is room for improvement and there is a need to provide a novel nose pad adjustment assembly which is more practical and effective to use.

SUMMARY OF THE INVENTION

Therefore, it is a primary object of the present invention to provide a nose pad adjustment assembly which allows users to move and adjust two nose pad blocks with respect to nose connection portions on two sides of a nose pad base according to different heights and widths of user's nose bridge for close fit of the nose pad blocks to two sides of the user's nose bridge. Thus glasses are worn and positioned firmly without sliding freely and the user feels more comfortable while wearing the glasses. The nose pad adjustment assembly is not only more convenient to operate but also more practical and effective to use.

In order to achieve the above object, a nose pad adjustment assembly according to the present invention includes a nose pad base and two nose pad blocks.

The nose pad base which is used to fix and connect with the glasses is provided with a recess portion formed on a middle of the nose pad base for leaning against the user's nose bridge, and two connection portions disposed on the nose pad base and located at two sides of the recess portion correspondingly. Each of the connection portions is provided with an upper locking hole and a lower locking hole.

Each of the nose pad blocks consists of an upper protrusion and a lower protrusion protruding from the nose pad block and respectively corresponding to the upper locking hole and the lower locking hole on the connection portion of the nose pad base. The upper protrusion and the lower protrusion are respectively able to be moved transversely within the upper locking hole and the lower locking hole and provided with a plurality of upper locking grooves and a plurality of lower locking grooves which are respectively able to be engaged and connected with the upper locking hole and the lower locking hole correspondingly.

Preferably, the nose pad base is integrally connected with either a frame or a lens of the glasses.

Preferably, an assembly portion is disposed on an upper end of the nose pad base for connection with the frame or the lens of the glasses.

Preferably, the nose pad block is made of soft material.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions with the figures and reference signs.

Figure 1:
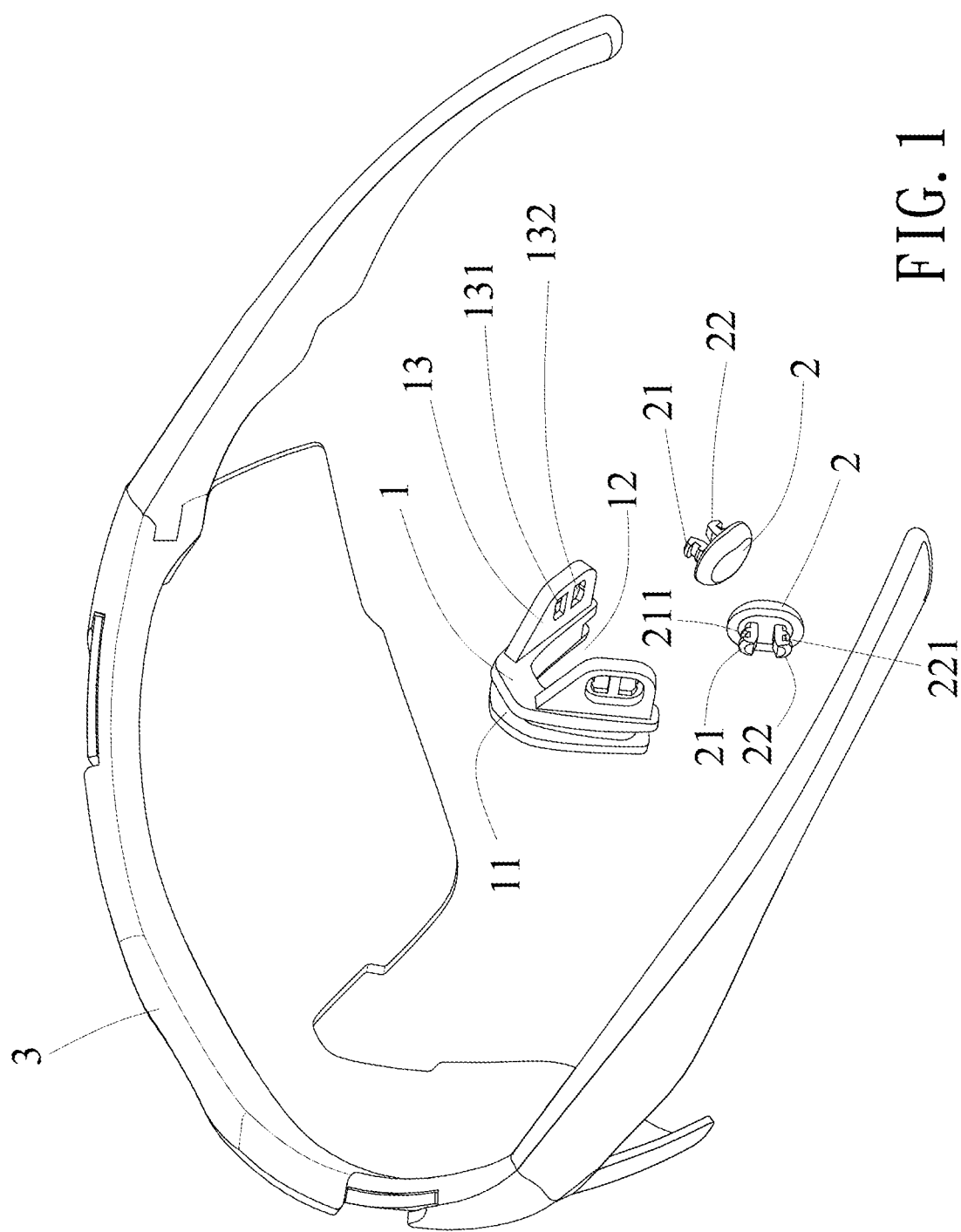
FIG. 1 is an exploded view of an embodiment according to the present invention.
Figure 2:
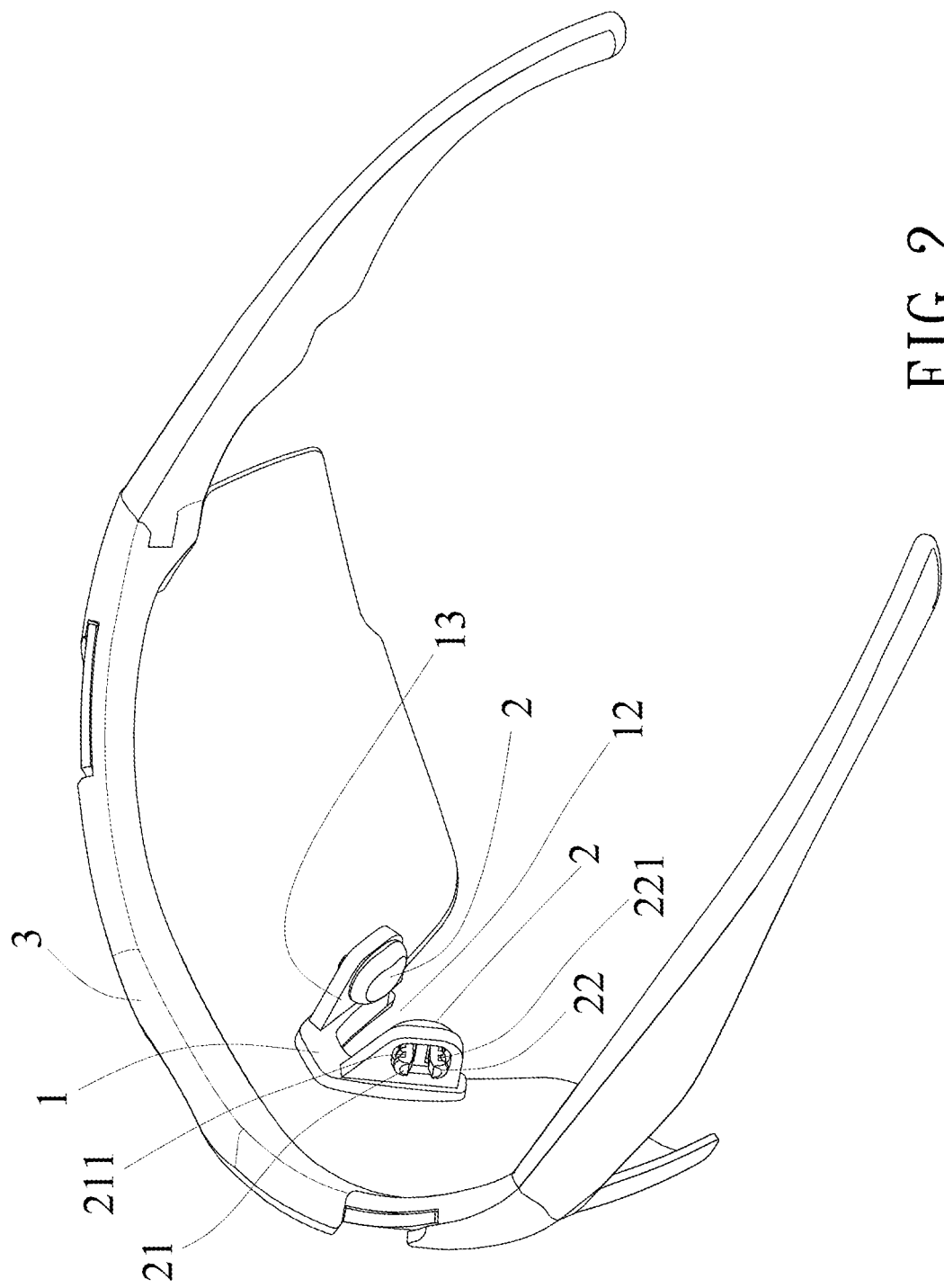
FIG. 2 is a perspective view of an embodiment according to the present invention.

Refer to FIG. 1 and FIG. 2, a nose pad adjustment assembly according to the present invention mainly includes a nose pad base 1 and two nose pad blocks 2.

The nose pad base 1 can be integrally connected with either a frame or a lens of a pair of glasses 3. Or the nose pad base 1 is further provided with an assembly portion 11 on an upper end thereof for connection with the frame or the lens of the glasses 3. The nose pad base 1 is further provided with a recess portion 12 formed on a middle of the nose pad base 1 for leaning against user's nose bridge, and two connection portions 13 arranged at the nose pad base 1 and corresponding to two sides of the recess portion 12. Each of the connection portions 13 is provided with an upper locking hole 131 and a lower locking hole 132.

Each of the nose pad blocks 2 which is made of soft material consists of an upper protrusion 21 and a lower protrusion 22 protruding from the nose pad block 2 and respectively corresponding to the upper locking hole 131 and the lower locking hole 132 on the connection portion 13 of the nose pad base 1. The upper protrusion 21 and the lower protrusion 22 are respectively able to be moved transversely within the upper locking hole 131 and the lower locking hole 132 and provided with a plurality of upper locking grooves 211 and a plurality of lower locking grooves 221 which are respectively able to be engaged and connected with the upper locking hole 131 and the lower locking hole 132 correspondingly.

Figure 3:
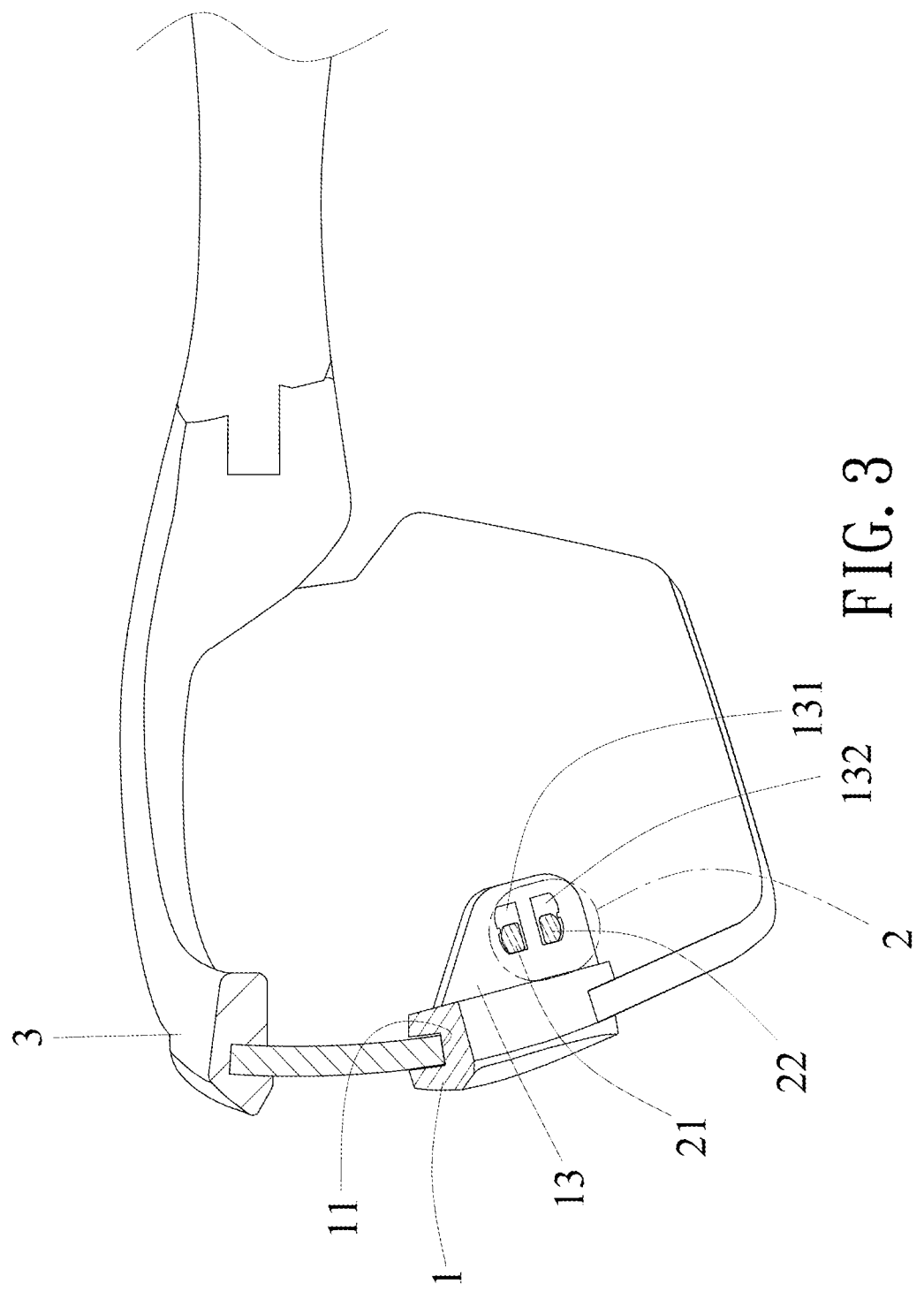
FIG. 3 is a schematic drawing showing nose pad blocks of an embodiment moved transversely in the same direction for adjustment according to the present invention.
Figure 4:
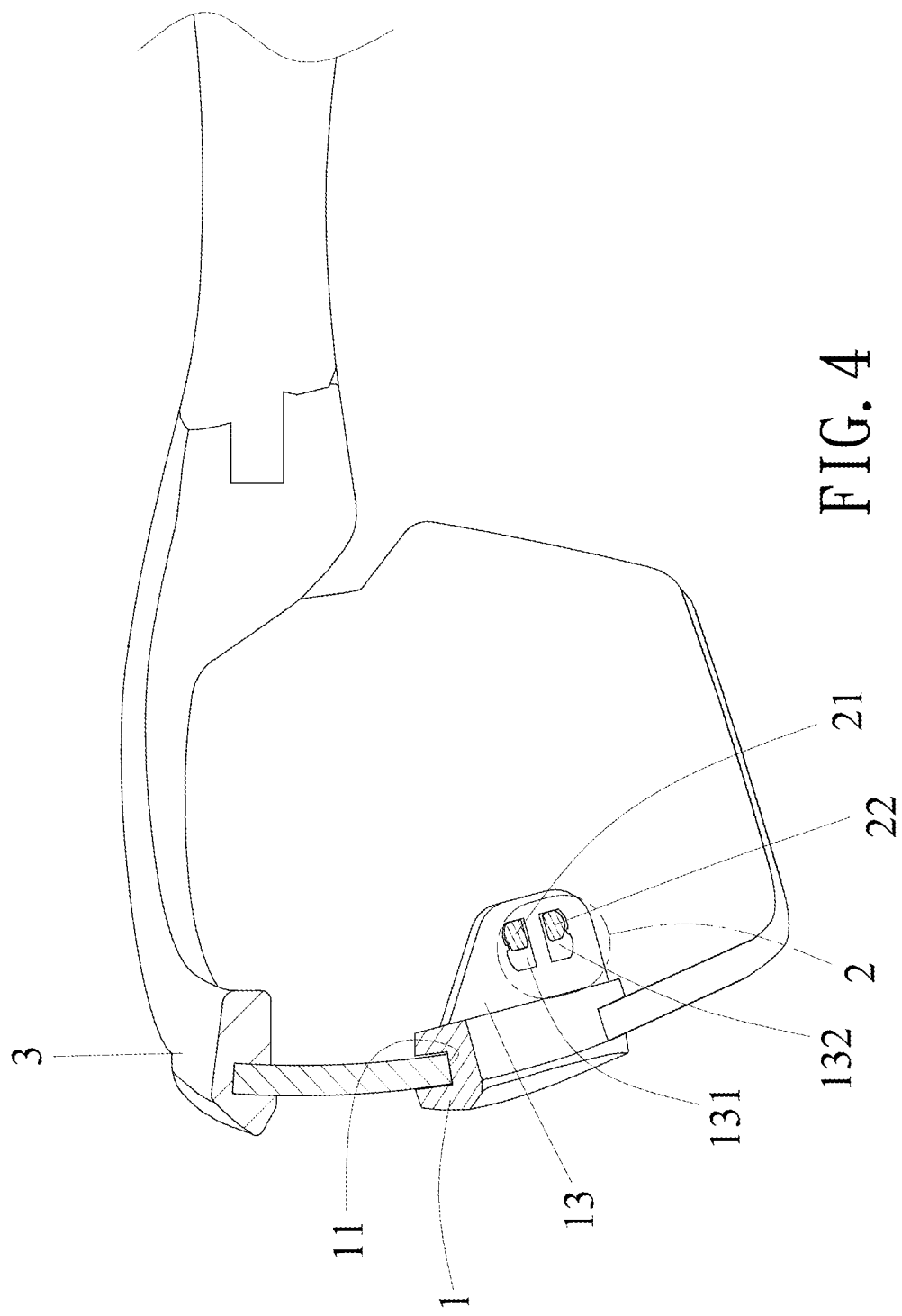
FIG. 4 is another schematic drawing showing nose pad blocks of an embodiment moved transversely in the same direction for adjustment according to the present invention.
Figure 5:
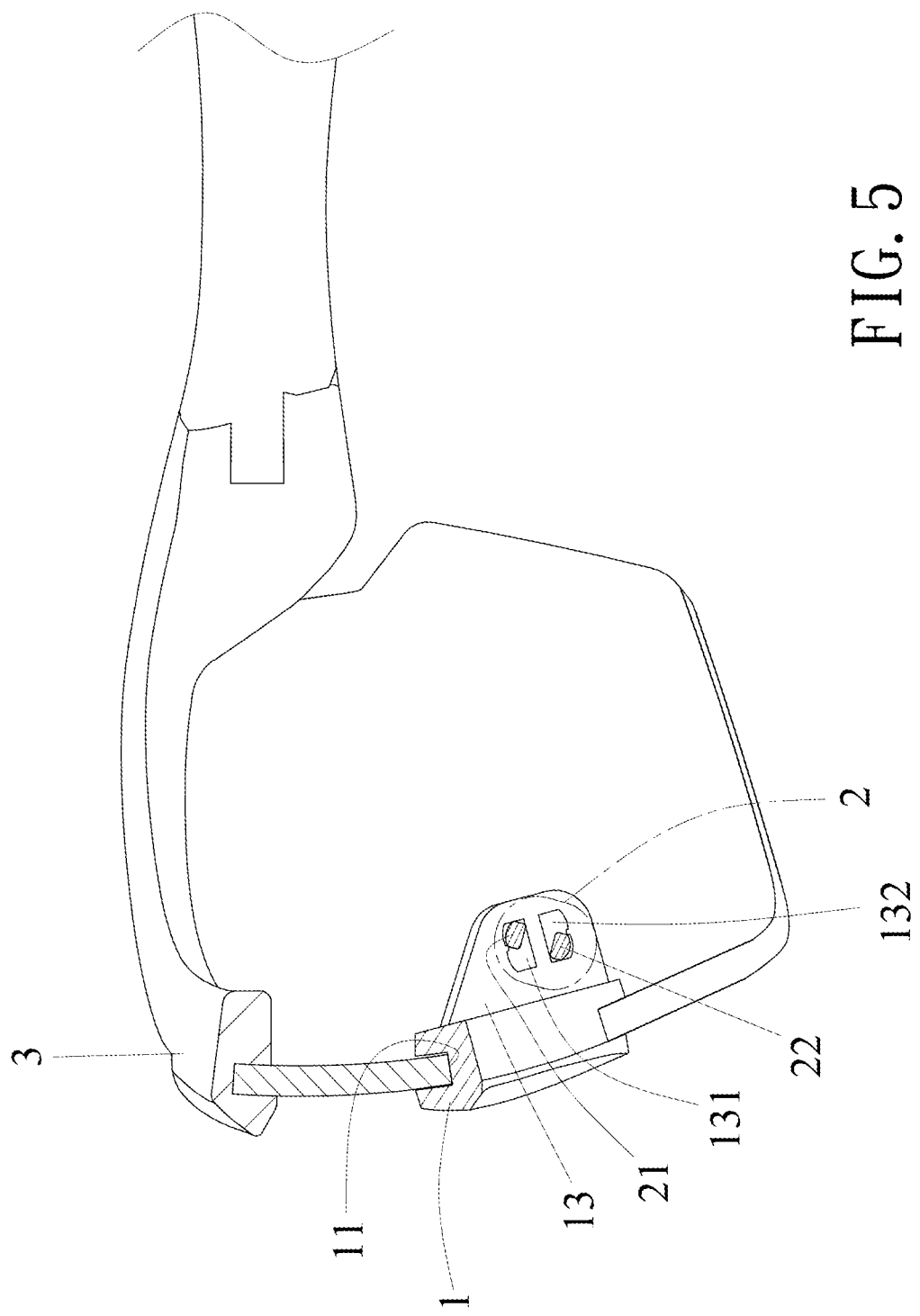
FIG. 5 is a schematic drawing showing nose pad blocks of an embodiment moved transversely toward different directions for adjustment according to the present invention.
Figure 6:
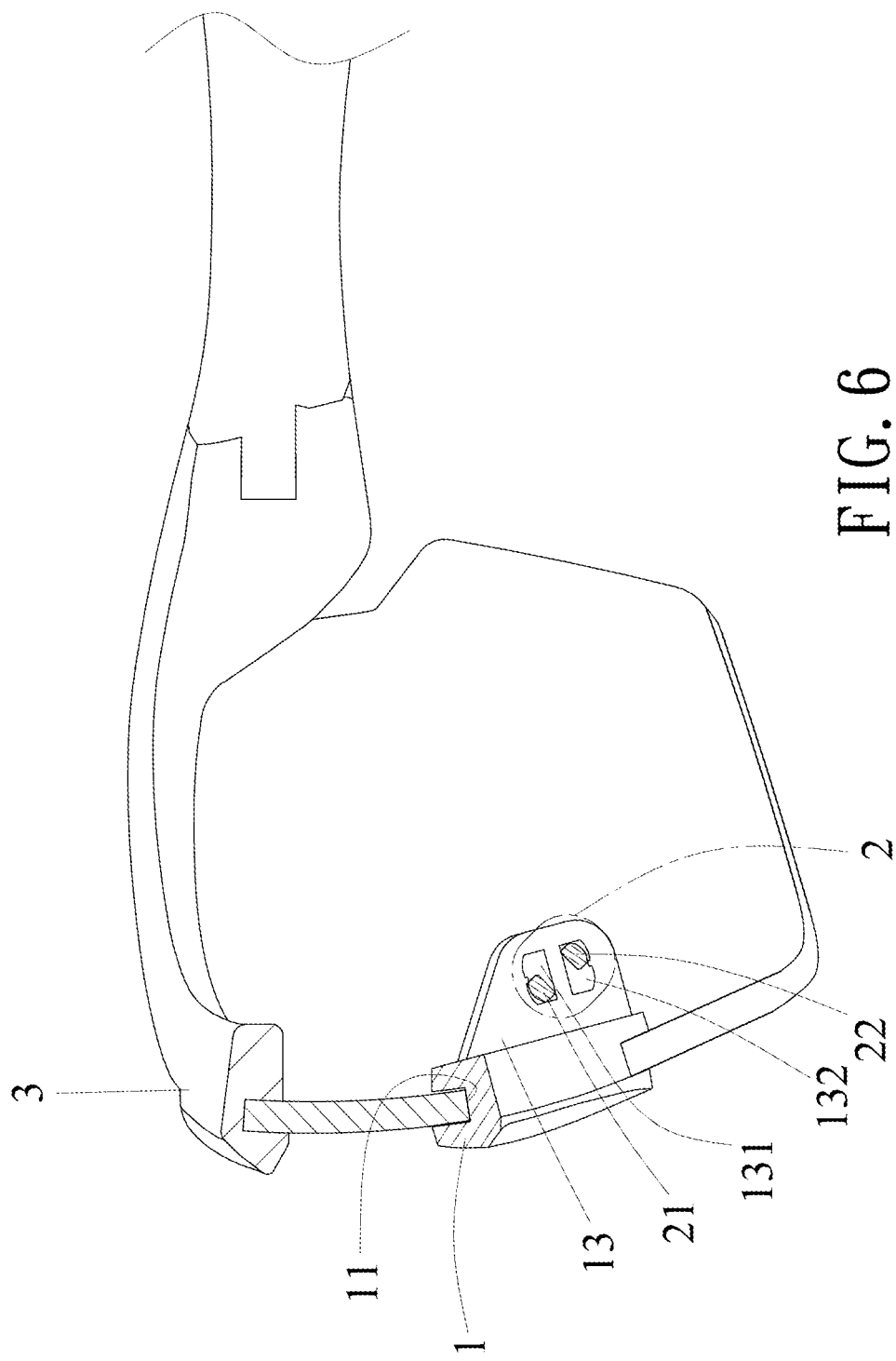
FIG. 6 is another schematic drawing showing nose pad blocks of an embodiment moved transversely toward different directions for adjustment according to the present invention.
Figure 7:
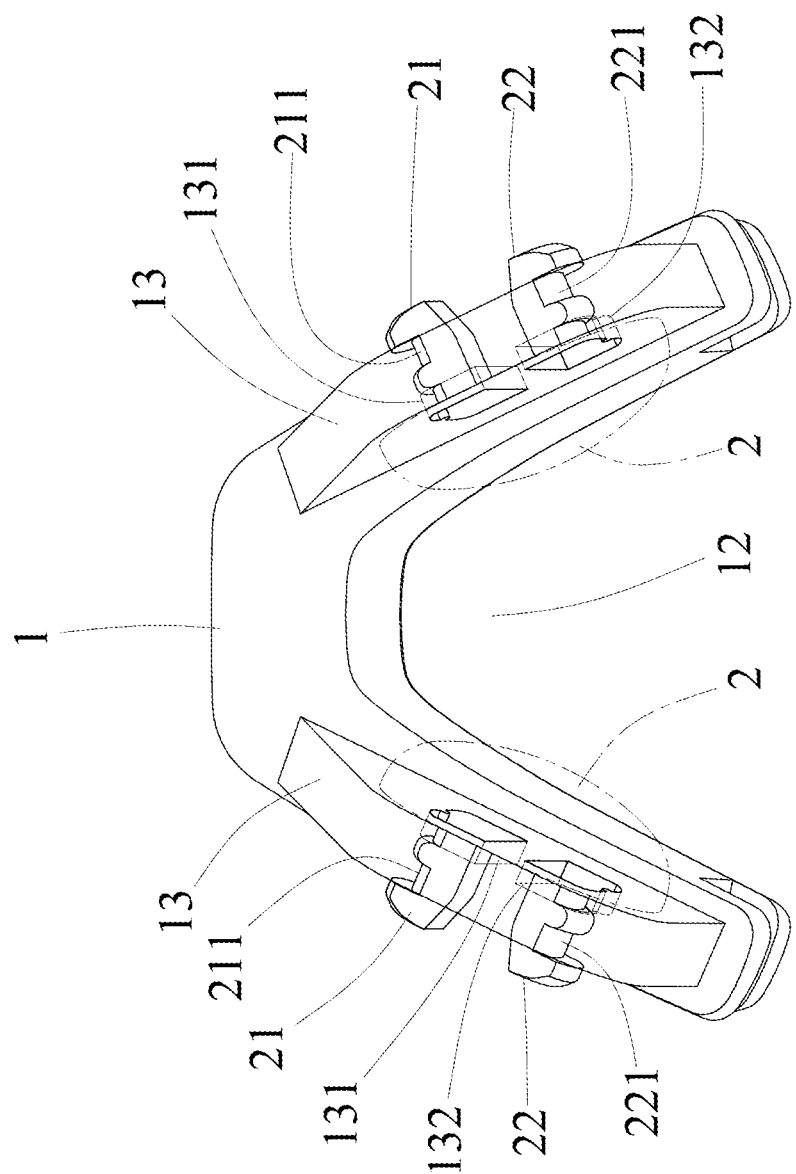
FIG. 7 is a schematic drawing showing an embodiment in which two nose pad blocks are adjusted and arranged symmetrically according to the present invention.
Figure 8:
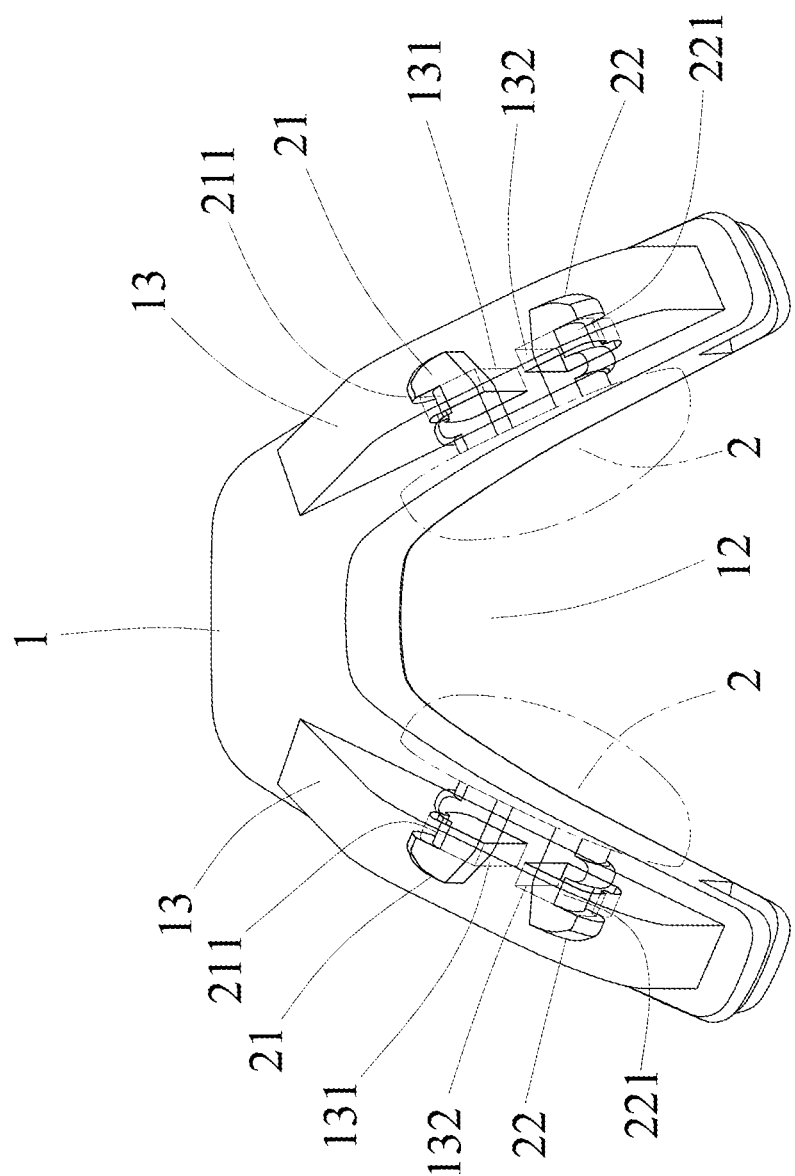
FIG. 8 is another schematic drawing showing an embodiment in which two nose pad blocks are adjusted and arranged symmetrically according to the present invention.
Figure 9:
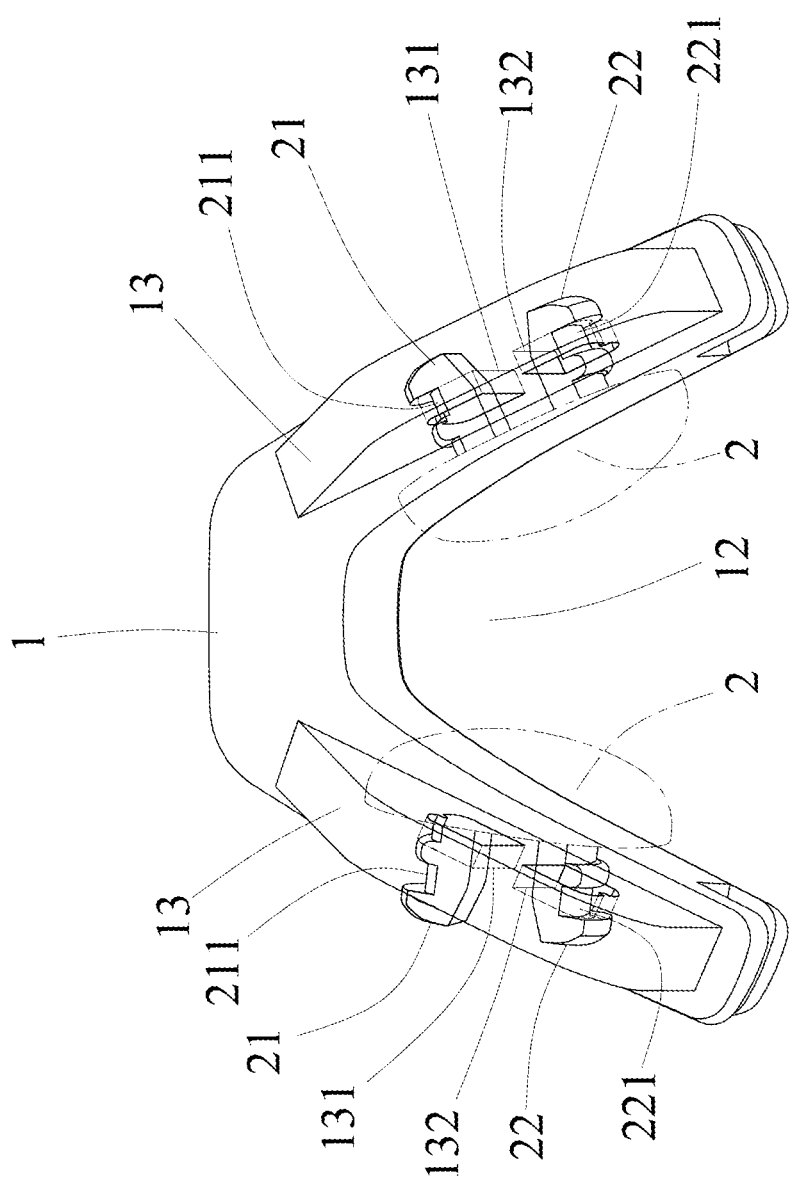
FIG. 9 is a schematic drawing showing an embodiment in which two nose pad blocks are adjusted and arranged asymmetrically according to the present invention.

While in use, the upper protrusion 21 and the lower protrusion 22 of the nose pad block 2 are respectively inserted into the upper locking hole 131 and the lower locking hole 132 of the connection portion 13 of the nose pad base 1 and then engaged and connected with the upper locking hole 131 and the lower locking hole 132 correspondingly for positioning. When a user wears the glasses 3, the recess portion 12 on the middle of the nose pad base 1 is leaning against the user's nose bridge and then the upper and the lower protrusions 21, 22 of the nose pad block 2 within the upper and the lower locking holes 131, 132 of the connection portion 13 are moved and adjusted transversely in the same direction according to different heights and widths of the user's nose bridge. Refer to FIG. 3 and FIG. 4, transverse movement of the nose pad blocks in the same direction for adjustment is revealed. Or as shown in FIG. 5 and FIG. 6, the upper and the lower protrusions 21, 22 of the nose pad block 2 within the upper and the lower locking holes 131, 132 of the connection portion 13 are respectively moved and adjusted transversely toward different directions. Refer to FIG. 7 and FIG. 8, the upper locking groove 211 and the lower locking groove 221 located at the same positions of the upper protrusion 21 and the lower protrusion 22 of the two nose pad blocks 2 are respectively mounted and connected with the upper locking hole 131 and the lower locking hole 132 of the connection portion 13 correspondingly. The two nose pad blocks 2 are adjusted and arranged symmetrically. As shown in FIG. 9, the upper locking groove 211 and the lower locking groove 221 located at different positions of the upper protrusion 21 and the lower protrusion 22 of the two nose pad blocks 2 are respectively engaged and connected with the upper locking hole 131 and the lower locking hole 132 of the connection portion 13 correspondingly. The two nose pad blocks 2 are adjusted and disposed asymmetrically. Thereby the nose pad blocks 2 are adjusted to the most suitable positions and leaning against the two sides of the user's nose bridge securely. Not only the glasses 3 is positioned firmly without sliding freely, the user also feels more comfortable while wearing the glasses 3.

In summary, the nose pad adjustment assembly according to the present invention allows users to move and adjust the nose pad blocks with respect to the nose connection portions on two sides of the nose pad base according to different heights and widths of the user's nose bridge for close fit of the nose pad blocks to two sides of the user's nose bridge. Thus the glasses are worn and positioned firmly without sliding freely and the user feels more comfortable while wearing the glasses. Therefore, the nose pad adjustment assembly is not only more convenient to operate but also more practical and effective to use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A nose pad adjustment assembly, comprising:
a nose pad base connected to glasses of a user; and
two nose pad blocks;
wherein the nose pad base is formed with a recess portion at a substantially middle section thereof for leaning against the user's nose bridge, and two connection portions are formed at the nose pad base to extend from a corresponding one of two opposing sides of the recess portion, wherein each of the two connection portions is formed with an upper locking hole and a lower locking hole, and wherein each of the upper and lower locking holes of each of the two connection portions are elongated in a direction substantially parallel to a thickness direction of a lens of the glasses;
wherein each of the two nose pad blocks is formed with an upper protrusion and a lower protrusion protruding from a corresponding section of the respective nose pad block for extending into a corresponding one of the upper locking hole and the lower locking hole of the respective connection portion to prevent the respective nose pad block from disengaging from the corresponding one of the upper locking hole and the lower locking hole, wherein each of the two nose pad blocks is, further, formed with a plurality of upper locking grooves between the corresponding upper protrusion and the corresponding section of the respective nose pad block and a plurality of lower locking grooves between the corresponding lower protrusion and the corresponding section of the respective nose pad block, and wherein a corresponding one of the plurality of upper locking grooves and a corresponding one of the plurality of lower locking grooves of each of the two nose pad blocks is engaged and connected with a corresponding one of the upper locking holes and a corresponding one of the lower locking holes of the respective connection portion whereby each of the two nose pad blocks is slidably engaged with the upper and lower locking holes of a corresponding connection portion for at least being slidably moveable in the thickness direction of the lens of the glasses.

2. The nose pad adjustment assembly as claimed in claim 1, wherein the nose pad base is integrally connected with either a frame or a lens of the glasses.

3. The nose pad adjustment assembly as claimed in claim 1, wherein the nose pad base is further provided with an assembly portion on an upper end thereof for connection with either a frame or a lens of the glasses.

4. The nose pad adjustment assembly as claimed in claim 1, wherein the nose pad block is made of soft material.

* * * * *